United States Patent [19]

Schopp

[11] Patent Number: 4,729,337

[45] Date of Patent: Mar. 8, 1988

[54] AIR PRESSURE INDICATOR

[76] Inventor: Edgar Schopp, 2210 Gratton, Riverside, Calif. 92504

[21] Appl. No.: 31,754

[22] Filed: Mar. 30, 1987

Related U.S. Application Data

[63] Continuation-in-part of Ser. No. 885,848, Jul. 16, 1986, abandoned.

[51] Int. Cl.⁴ .............................................. B60C 23/02
[52] U.S. Cl. ......................... 116/34 R; 116/DIG. 8; 116/DIG. 9; 116/270
[58] Field of Search ...................... 116/34 R, 266–268, 116/270–281, DIGS. 7–9, DIG. 25; 73/146.3, 146.8, 715, 731; 137/227–229

[56] References Cited

U.S. PATENT DOCUMENTS

| | | | |
|---|---|---|---|
| 1,368,400 | 2/1921 | Kelley | 116/34 R |
| 1,744,590 | 1/1930 | Sutherland | 73/731 |
| 2,225,675 | 12/1940 | West | 116/34 R |
| 2,417,449 | 3/1947 | Rubin | 116/34 R |
| 2,704,045 | 3/1955 | Riesing | 116/34 R |
| 3,111,930 | 11/1963 | Zipper | 116/34 R |
| 3,380,427 | 4/1968 | Rubin | 116/34 R |
| 3,452,708 | 7/1969 | Richardson | 73/146.8 |
| 3,492,968 | 2/1970 | Workman, Jr. | 116/270 |
| 3,799,037 | 3/1974 | Schmidt | 137/227 |
| 4,024,829 | 5/1977 | Su | 116/34 R |
| 4,155,325 | 5/1979 | Yu | 116/34 R |
| 4,572,097 | 2/1986 | Chapelsky | 116/227 |
| 4,601,254 | 7/1986 | Huang et al. | 116/34 R |

Primary Examiner—William A. Cuchlinski, Jr.
Assistant Examiner—W. Morris Worth
Attorney, Agent, or Firm—Harvey S. Hertz

[57] ABSTRACT

An air pressure indicator for mounting on an automobile tire valve. An inflatable balloon is used to indicate a desired condition. The balloon is surrounded by a transparent cap. Should the air pressure in the tire fall below a desired level, the balloon will deflate. A free floating valve is positioned in a cavity formed adjacent to the transparent cap. The valve seals an air passage through the transparent cap should the inflatable balloon rupture.

2 Claims, 3 Drawing Figures

U.S. Patent     Mar. 8, 1988     4,729,337
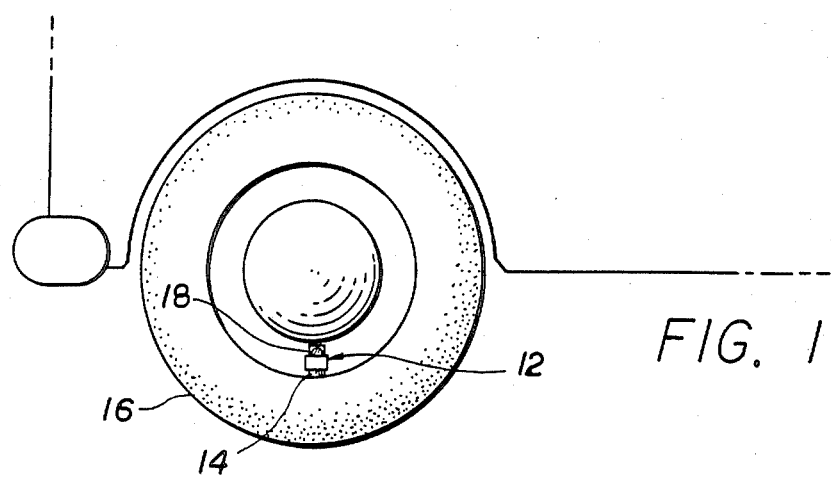
FIG. 1
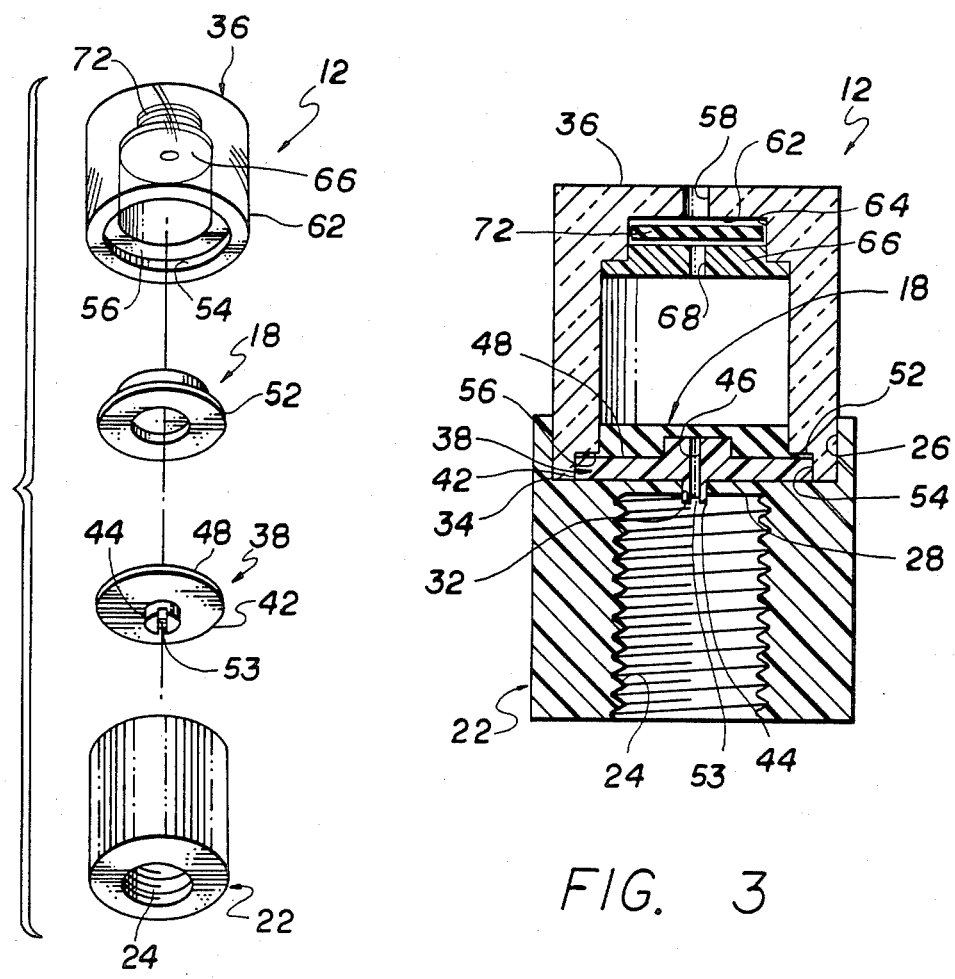
FIG. 2
FIG. 3

AIR PRESSURE INDICATOR

This is a continuation-in-part of copending application Ser. No. 885,848 filed on July 16, 1986, now abandoned.

FIELD OF THE INVENTION

The field of art to which the invention pertains include the field of vehicle tire air pressure indicators, and more particularly, to an air pressure indicator mounted on a valve stem of a vehicle tire for indicating when the pressure reached a predetermined low level.

DESCRIPTION OF THE PRIOR ART

Air pressure indicators which are mounted on automobile tire valve stems are relatively well known. Typically, these indicators utilize the tire pressure to move a spring member to a first predetermined position. When the tire loses air pressure, the spring member moves an indicator from a first position to a second position, thus giving the user of the vehicle an indication that one of the tires is below a certain a minimum pressure.

Known prior art includes U.S. Pat. Nos. 4,476,803; 4,465,013; 3,260,233; 3,572,283; 3,792,677; 1,834,079; 2,479,915; 2,794,343; 3,106,183 and 3,111,930.

Such indicator devices are relatively expensive and the spring member and its complex accompanying structure must be correctly mounted to allow the indicator to operate correctly.

Further, while air pressure indicators which do not use spring members are known, they do not provide the safety required should the indicator element, such as a balloon, fail.

SUMMARY OF THE INVENTION

The present invention utilizes an air pressure indicator having a main body housing with a threaded bore extending from one end of the housing and a second bore extending from the other end thereof. The bores are coaxial and each terminate at a flange formed in plane perpendicular to the body housing axis. An aperture formed in the flange interconnects the bores. A valve activator plug is formed of a shoulder having a stem extending from one side of the shoulder in an axis perpendicular to the shoulder and is positionable in the housing aperture when one surface of the shoulder is juxtaposed with the flange and the shoulder is positioned in the second bore. The other side of the shoulder has a lip formed around the periphery thereof. A fluid passage is formed along an axis perpendicular to the shoulder enabling the fluid to pass from one side of the shoulder to the other side thereof. The fluid passage extends through the stem. An inflatable balloon is defined by cup-shaped member having a flange extending along the periphery thereof for securing the balloon to the valve activator lip. The balloon is inflatable to indicate a desired condition by fluid passing through the valve activator fluid passage. A transparent cap is positioned over the balloon member and has an enlarged bore terminating at an outwardly facing shoulder. The cap shoulder is positioned on the balloon flange for preventing movement of the balloon flange with respect to the valve activator plug. An air vent passageway in the transparent cap enables the balloon to inflate as the outer surface of the balloon is subjected to normal atmospheric air pressure. A floating valve in the air vent passageway seals the passage should the balloon suddenly fail.

The advantages of this invention both as to its construction and mode of operation will be readily appreciated as the same becomes better understood by reference to the following accompanying drawings in which like reference numerals designate like parts through out the figures.

BRIEF DESCRIPTION OF THE DRAWINGS

FIG. 1 illustrates the air pressure indicator mounted on the valve stem of a automobile tire;

FIG. 2 is an exploded perspective view of the air pressure indicator; and

FIG. 3 is a cross sectional view of an assembled air pressure indicator.

DESCRIPTION OF THE PREFERRED EMBODIMENT

Referring now to the drawings, there is shown in FIG. 1, an air pressure indicator 12 mounted on the valve stem 14 of a tire 16. In normal operation, an indicator member such as a balloon 18 in the air pressure indicator is visible indicating to the user that there is sufficient air pressure available in the tire. Should the tire lose a predetermined amount of air pressure, the balloon will recede to within the indicator thus visually notifying the user that there is a low pressure condition within the tire. Typically, the indicator balloon 18 may be colored red or other colors which is clearly visible to the naked eye. When the red color is not visible the user will immediately become aware of the low pressure condition.

Referring now to FIGS. 2 and 3, the air pressure indicator 12 of FIG. 1 is shown in greater detail in an exploded perspective view, and in cross-section, respectively.

The air pressure indicator 12 includes a main body housing 22 having a threaded bore 24 which extends from one end of the housing and a second bore 26 which extends from the other end of the housing. The threaded bore 24 and the second bore 26 each terminate on respective sides of a flange 28 formed in a plane perpendicular to the body housing axis. Normally, the threaded bore 24 is adapted to be threaded onto a valve stem, such as valve stem 14 of FIG. 1.

The main body housing 22 also includes an aperture 32 formed in the flange 28 which interconnects and extends to both sides of bores 24 and 26 to define a fluid passage. In addition, a slight ridge 34 is formed about the periphery of the junction of the second bore 26 and the flange 28. The ridge 34 is utilized to secure a transparent cap 36 to the main body housing as will be explained in greater detail hereinafter.

A valve activator plug 38 is formed of a shoulder 42 having a stem 44 extending from one side of the shoulder along an axis perpendicular to the plane of the shoulder. The stem 44 is positioned in the main body housing apparture 32 when the surface of the shoulder 42 is juxtaposed with the flange 28.

A fluid passage 46 formed along the axis perpendicular to the plane of the shoulder 42 enables fluid to pass from one side of the shoulder 42 to the other side thereof, the fluid passage extending through the stem 44 and the shoulder 42. A lip 48 is formed around the periphery of the shoulder and is utilized to position a flange 52 of the balloon 18 thereon. The balloon 52 is of generally a cup-shaped configuration and is inflated when air from a tire, such as the tire 16 of FIG. 1, passes through the aperture passage 46 in the valve activator plug 38. In this regard, it should be noted that the end of the stem 44 which extends into the threaded bore 24 contains a slot 53 tranversly extending across the passage 46 to enable air to flow from the valve stem 14 toward the ballon 18. Otherwise, of course, the valve stem 14 would block air passage flow into the passage 46.

The transparent cap 36 is of generally U-shaped configuration in cross-section and includes an enlarged bore 54 at its free end which terminates at an outwardly facing shoulder 56. When assembled as shown in FIG. 3, the shoulder 56 abuts the balloon flange 52 positioned in the valve activator plug lip 48, thus securing the balloon flange between the valve activator plug 38 and the transparent cap 36. Thus, when air passing from the tire through the fluid passage 46 inflates the balloon, and balloon stretches into the outer portion of the transparent cap 36 where it is visible to the user.

An air vent 58 is formed between the exterior and the interior portion of the transparent cap 36.

The air vent 58 terminates at an inwardly facing surface 62 of a reduced diameter bore 64. A plastic disc 66 having an interior air passageway 68 is secured to the interior of the transparent cap at the bore 64 and is spaced from the surface 62. A free floating rubber valve 72 is positioned between the surface 62 and the disc 66 enabling the air passageway defined by the air vent 58 and air passageway 68 in the disc 66 to be continuous. Thus the air vent 58 and air passageway 68 enable the balloon 18 to inflate as the outer surface of the balloon is subjected to normal atmospheric air pressure.

Should the balloon 18 fail (rupture) air pressure will force the valve 72 against the surface 62, closing air vent 58 and preventing leakage of air from the tire.

Normally, in assembly as shown in FIG. 3, the outer periphery 62 of the free end of the transparent cap 36 is positioned adjacent the ridge 34 of the main body housing 22. Ultrasonic welding can be utilized to secure the main body housing 22 to the cap 36 at the ridge 34, thus forming a tight sealed package.

The strength of the balloon 18 material is chosen so that at a predetermined air pressure, the balloon will deflate and not be visible in the transparent cap. Normally, this pressure varies from approximately 3 to 5 pounds and is not used to give an accurate measurement of air pressure in the tire to the user, but merely as an indication that the tire has lost sufficient pressure and the tires should be checked.

What is claimed:

1. An air pressure indicator for mounting on an air inflatable tire valve comprising:

a main body housing having a threaded bore extending from one end thereof and a second bore extending from another other end thereof, said bores being coaxial and terminating at a flange formed in a plane perpendicular to the body housing axis and an aperture formed in said flange interconnecting said bores;

a valve activator plug formed of a shoulder having a pair of opposed sides and having a stem extending from one side of the shoulder along an axis perpendicular to the plane of said shoulder and being positionable in said housing aperture when one surface of said shoulder is juxtaposed with said housing flange and said shoulder is positioned in said second bore, the other side of said shoulder having a lip formed around a periphery thereof, and a fluid passage formed along an axis perpendicular to said shoulder enabling said fluid to pass from one side of said shoulder to the other side thereof, said fluid passage extending through said stem;

an inflatable balloon defined by a cup-shaped member whose free edge defines a periphery, said balloon having a flange extending along the periphery thereof for securing said balloon to said valve activator lip, said balloon being inflatable to indicate a desired condition of air inflation by fluid passing through said valve activator fluid passage, said balloon deflating when the air pressure drops below a predetermined air pressure level, a transparent cap positioned over said balloon, said cap having an enlarged bore terminating at an outwardly facing shoulder, said cap shoulder being positioned on said balloon flange for preventing movement of said balloon flange with respect to said valve activator plug; an air passage formed in said transparent cap, said air passage enabling one surface of said balloon to be subjected to normal atmospheric air pressure, and a free floating valve positioned in a cavity formed in a platen perpendicular to said air passage, said cavity being defined by said transparent cap on one side thereof and a disc member having an air passage therethrough on the other side side thereof, said valve sealing said air passage in said cap should said inflatable balloon rupture.

2. An air pressure indicator in accordance with claim 1 wherein said cavity forms a continuation of said air passages in said disc and said transparent cap.

* * * * *